United States Patent
Tambi et al.

(10) Patent No.: US 12,153,619 B2
(45) Date of Patent: Nov. 26, 2024

(54) GENERATIVE PROMPT EXPANSION FOR IMAGE GENERATION

(71) Applicant: ADOBE INC., San Jose, CA (US)

(72) Inventors: Ritiz Tambi, San Francisco, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/933,595

(22) Filed: Sep. 20, 2022

(65) Prior Publication Data
US 2024/0095275 A1    Mar. 21, 2024

(51) Int. Cl.
G06F 16/00    (2019.01)
G06F 16/532    (2019.01)

(52) U.S. Cl.
CPC ................ *G06F 16/532* (2019.01)

(58) Field of Classification Search
None
See application file for complete search history.

(56) References Cited

U.S. PATENT DOCUMENTS

| | | | | |
|---|---|---|---|---|
| 8,566,303 B2 * | 10/2013 | Jin | | G06F 16/90335 |
| | | | | 707/708 |
| 8,615,524 B2 * | 12/2013 | Kanigsberg | | G06F 16/9535 |
| | | | | 707/765 |
| 9,015,185 B2 * | 4/2015 | Kanigsberg | | G06Q 30/0269 |
| | | | | 707/765 |
| 9,342,627 B2 * | 5/2016 | Jin | | G06F 16/90335 |
| 9,576,313 B2 * | 2/2017 | Kanigsberg | | G06F 16/9535 |
| 11,455,332 B2 * | 9/2022 | Horie | | G06V 10/7784 |
| 2011/0219004 A1 * | 9/2011 | Jin | | G06F 16/355 |
| | | | | 707/E17.09 |
| 2014/0074884 A1 * | 3/2014 | Jin | | G06F 16/90335 |
| | | | | 707/771 |
| 2016/0140130 A1 * | 5/2016 | Smirnov | | G06F 16/903 |
| | | | | 707/740 |
| 2016/0239487 A1 * | 8/2016 | Potharaju | | G06F 16/24578 |
| 2017/0075996 A1 * | 3/2017 | Azimi | | G06F 16/951 |
| 2020/0356591 A1 * | 11/2020 | Yada | | G06F 16/5862 |
| 2021/0073267 A1 * | 3/2021 | Chopra | | G06N 3/04 |
| 2021/0117466 A1 * | 4/2021 | Horie | | G06F 16/532 |
| 2021/0165960 A1 | 6/2021 | Eisenschlos et al. | | |
| 2022/0188661 A1 * | 6/2022 | Tappin | | G06F 16/248 |
| 2022/0253477 A1 * | 8/2022 | Lipka | | G06N 20/00 |

(Continued)

OTHER PUBLICATIONS

DALL•E: Creating Images from Text, Jan. 5, 2021, found on the internet at: https://openai.com/blog/dall-e/.

(Continued)

*Primary Examiner* — Farhan M Syed
(74) *Attorney, Agent, or Firm* — F. CHAU & ASSOCIATES, LLC

(57) ABSTRACT

Systems and methods for query processing are described. Embodiments of the present disclosure identify an original query; generate a plurality of expanded queries by generating a plurality of additional phrases based on the original query using a causal language model (CLM) and augmenting the original query with each of the plurality of additional phrases, respectively; and provide a plurality of images in response to the original query, wherein the plurality of images are associated with the plurality of expanded queries, respectively.

19 Claims, 14 Drawing Sheets

(56) References Cited

U.S. PATENT DOCUMENTS

2022/0327586 A1    10/2022  Malon
2023/0016157 A1*    1/2023  Ferreira Moreno ... G06N 5/022
2023/0135659 A1     5/2023  Wu

OTHER PUBLICATIONS

Devlin, et al., "BERT: Pre-training of Deep Bidirectional Transformers for Language Understanding", arXiv preprint arXiv:1810.04805v2 [cs.CL] May 24, 2019, 16 pages.
Liu, et al., "RoBERTa: A Robustly Optimized BERT Pretraining Approach", arXiv preprint arXiv:1907.11692v1 [cs.CL] Jul. 26, 2019, 13 pages.
Bojanowski, et al., "Enriching Word Vectors with Subword Information", Transactions of the association for computational linguistics, 5, pp. 135-146, arXiv preprint: arXiv:1607.04606v2 [cs.CL] Jun. 19, 2017.
Joulin, et al., "Bag of Tricks for Efficient Text Classification", arXiv preprint arXiv:1607.01759v3 [cs.CL] Aug. 9, 2016, 5 pages.
Sennrich, et al., "Neural Machine Translation of Rare Words with Subword Units", arXiv preprint arXiv:1508.07909v5 [cs.CL] Jun. 10, 2016, 11 pages.
Radford, et al, "Language Models are Unsupervised Multitask Learners", OpenAI blog, 1(8), 9, (2019), 24 pages.
Office Action dated Sep. 19, 2024 in related U.S. Appl. No. 17/934,690.

* cited by examiner

GENERATIVE PROMPT EXPANSION FOR IMAGE GENERATION

BACKGROUND

The following relates generally to query processing. Query processing is a field of natural language processing (NLP) that refers to techniques for using computers to interpret or generate natural language. In some cases, NLP tasks involve assigning annotation data such as grammatical information to words or phrases within a natural language expression. Different classes of machine-learning algorithms have been applied to NLP tasks. In some examples, a user inputs a query to a search system (e.g., a search engine) to generate a set of images related to the query. A machine learning model (e.g., an image generation network) may provide different images dependent on the search queries.

However, conventional query processing systems are not able to automatically generate alternative queries or augmented queries based on an original query from a user. Accordingly, these systems are limited to a static number of images provided for users. Therefore, there is a need in the art for an improved query processing system that can efficiently manage query expansion.

SUMMARY

The present disclosure describes systems and methods for query processing. Embodiments of the present disclosure include a query processing apparatus configured to generate alternative queries based on an original query from a user (i.e., prompt expansion). The query processing apparatus receives an original query, generates a set of expanded queries and provides a set of images in response to the original query. These images are associated with the set of expanded queries, respectively. In some examples, expanded queries are generated using a causal language model (CLM). The CLM adds an additional phrase at the end of the original query. The process of adding an additional phrase may be referred to as "broaden intent" phase. Additionally or alternatively, the query processing apparatus replaces a mask token with an insertion phrase using a masked language model (MLM) to obtain a modified query. The process of replacing a mask token with an insertion phrase may be referred to as "narrow intent" phase. With a combination of phases involving broaden and narrow to obtain alternative queries, some embodiments of the present disclosure provide a more diverse set of relevant results (e.g., images).

A method, apparatus, and non-transitory computer readable medium for query processing are described. One or more embodiments of the method, apparatus, and non-transitory computer readable medium include identifying an original query; generating a plurality of expanded queries by generating a plurality of additional phrases based on the original query using a CLM and augmenting the original query with each of the plurality of additional phrases, respectively; and providing a plurality of images in response to the original query, wherein the plurality of images are associated with the plurality of expanded queries, respectively.

A method, apparatus, and non-transitory computer readable medium for query processing are described. One or more embodiments of the method, apparatus, and non-transitory computer readable medium include identifying an original query; generating an expanded query based on the original query using a CLM; inserting a mask token at a target location of the expanded query; replacing the mask token with an insertion phrase using a MLM to obtain a modified query; and providing an image based on the modified query.

An apparatus and method for query processing are described. One or more embodiments of the apparatus and method include a processor; a memory including instructions executable by the processor; a CLM configured to generate an expanded query based on an original query; and an MLM configured to replace a mask token in the expanded query with an insertion phrase to obtain a modified query.

DETAILED DESCRIPTION

Figure 1:
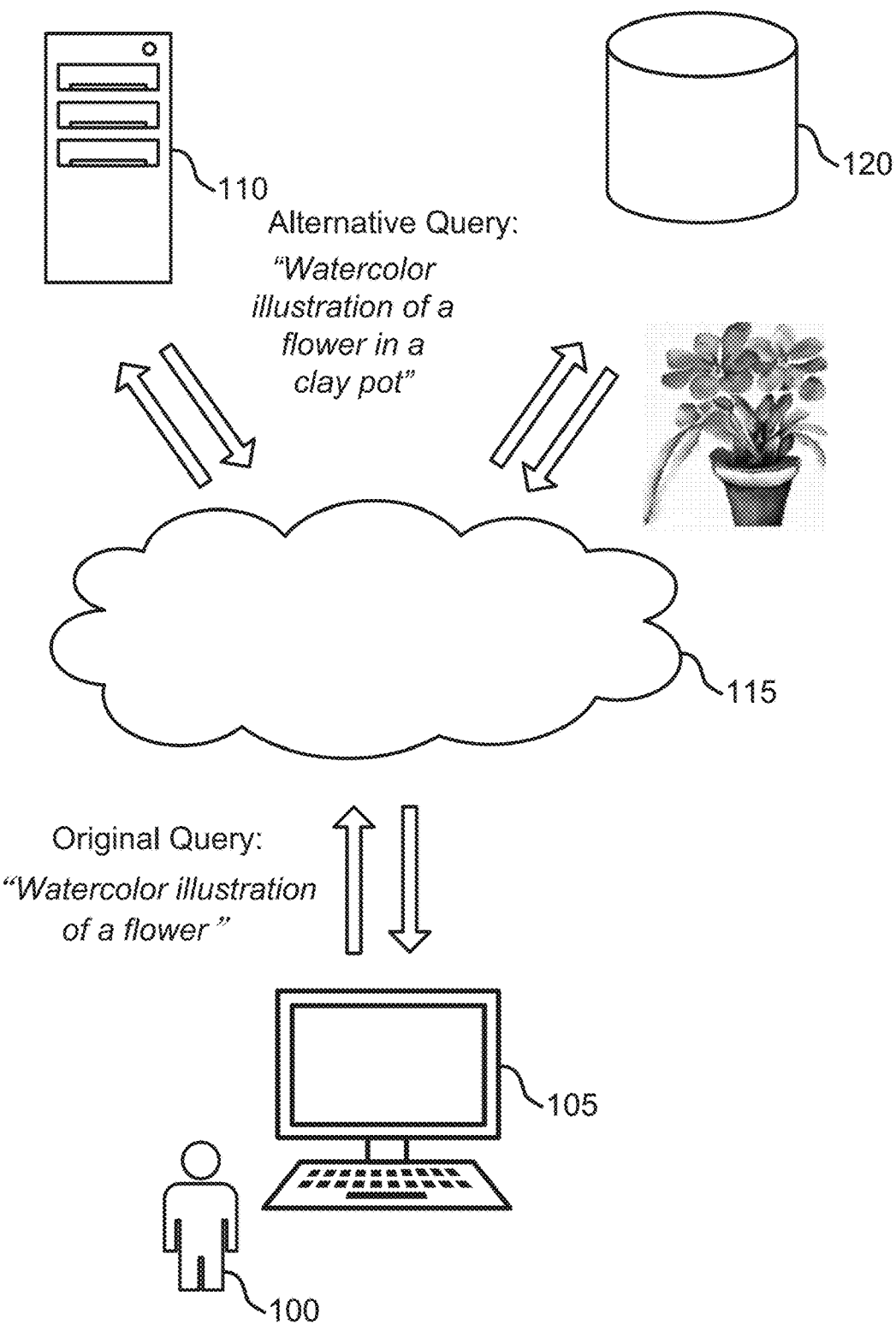
FIG. 1 shows an example of a query processing system according to aspects of the present disclosure.

The present disclosure describes systems and methods for query processing. Embodiments of the present disclosure include a query processing apparatus configured to generate alternative queries based on an original query from a user (i.e., prompt expansion). The query processing apparatus receives an original query, generates a set of expanded queries and provides a set of images in response to the original query. These images are associated with the set of expanded queries, respectively. In some examples, expanded queries are generated using a causal language model (CLM). The CLM adds an additional phrase at the end of the original query. The process of adding an additional phrase may be referred to as "broaden intent" process. Additionally or alternatively, the query processing apparatus replaces a mask token with an insertion phrase using a masked language model (MLM) to obtain a modified query. The process of replacing a mask token with an insertion phrase may be referred to as "narrow intent" process. With a combination of the broaden intent and narrow intent processes to obtain alternative queries, embodiments of the present disclosure provide a more diverse set of relevant results (e.g., images).

Recently, image generation systems are used to generate images based on text such as queries. A multi-modal embedding model can convert text and images into a same embedding space. When a user specifies a prompt, the prompt is converted to a prompt embedding that is used to condition the generative model to produce an output image. However, images from these conventional systems are static. That is, the scope of the output images is limited due to static queries. Accordingly, the user receives output images with relatively few variations.

Embodiments of the present disclosure include a query processing apparatus configured to provide an expanded set of image results based on an original query. In some examples, the query processing apparatus, via an image generation model, is configured to generate a set of images in response to the original query. These images are based on the expanded query, respectively. In some examples, the query processing apparatus compares the modified query embedding to an image embedding to calculate a similarity score (e.g., cosine similarity) and selects the image from a database based on the similarity score.

According to some embodiments, the query processing apparatus generates expanded queries using a causal language model. The causal language model adds an additional phrase at the end of the original query, referred to as a "broaden intent" phase. A tokenizer of the query processing apparatus is configured to tokenize the original query to obtain a set of original tokens. The causal language model generates a sequence of tokens. Each token of the sequence of tokens is generated based on the set of original tokens and a sequence of previously generated tokens. The causal language model predicts an additional phrase based on the sequence of tokens. The additional phrase is inserted at the end of the original query and is consistent with the context of the original query.

Some embodiments of the present disclosure also involve replacing the mask token with an insertion phrase using a masked language model to obtain a modified query, referred to as "narrow intent" phase. The masked language model is configured to insert a mask token at a target location of the expanded query. The masked language model replaces the mask token with an insertion phrase to obtain a modified query. The query processing apparatus provides an image based on the modified query. With the combination of a causal language model and a masked language model to obtain alternative queries, one or more embodiments of the present disclosure, e.g., through image retrieval or image generation, provide a more diverse set of relevant results (e.g., images)

Embodiments of the present disclosure may be used in the context of prompt expansion and image generation applications. For example, a query processing network based on the present disclosure may take an original query and efficiently generate a variety of images based on alternative queries. An example application, according to some embodiments, is provided with reference to FIG. 4. Details regarding the architecture of an example query processing apparatus are provided with reference to FIGS. 1-3. Example processes for image processing are provided with reference to FIGS. 4-14.

Network Architecture

Figure 2:
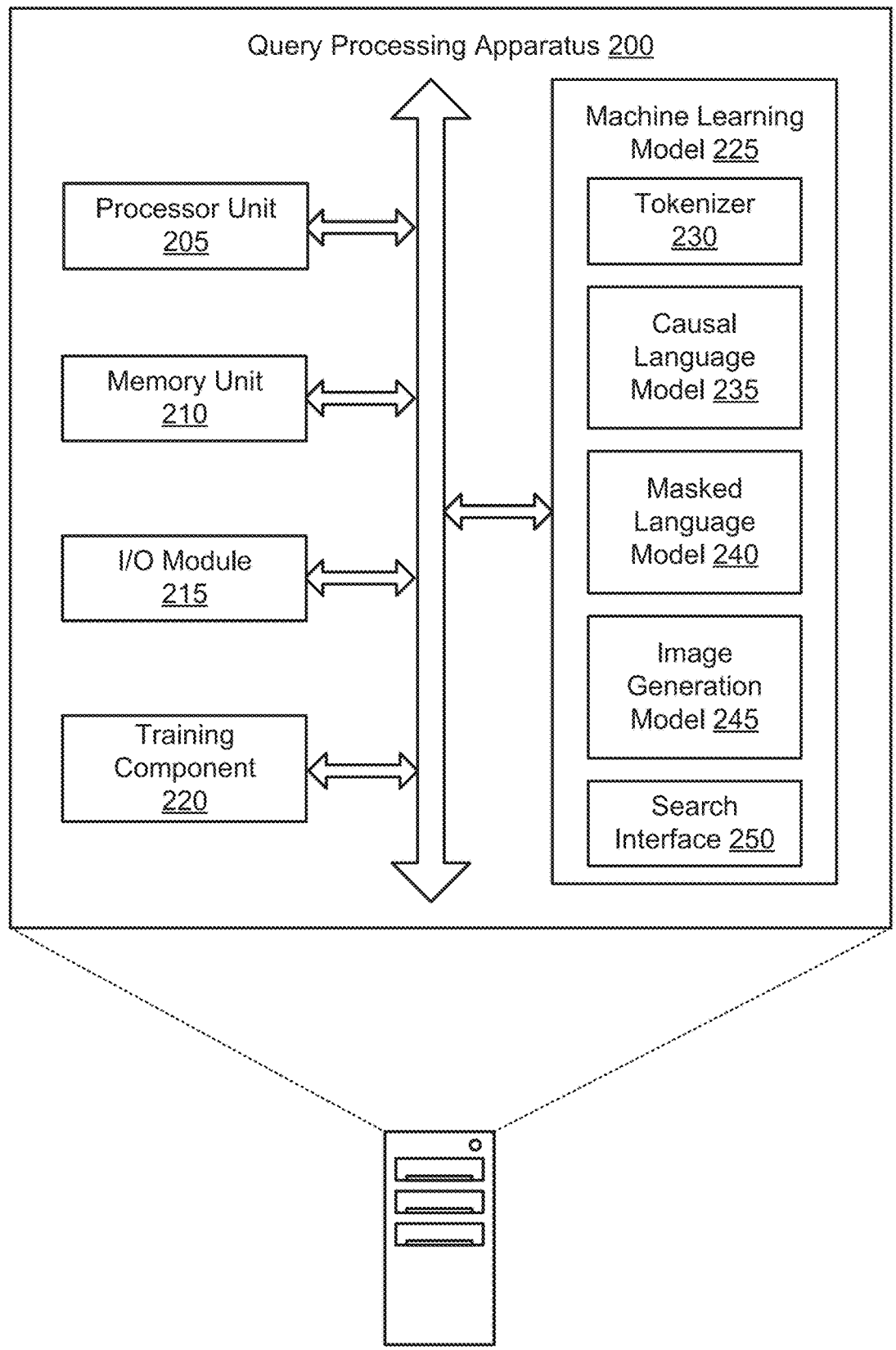
FIG. 2 shows an example of a query processing apparatus according to aspects of the present disclosure.
Figure 3:
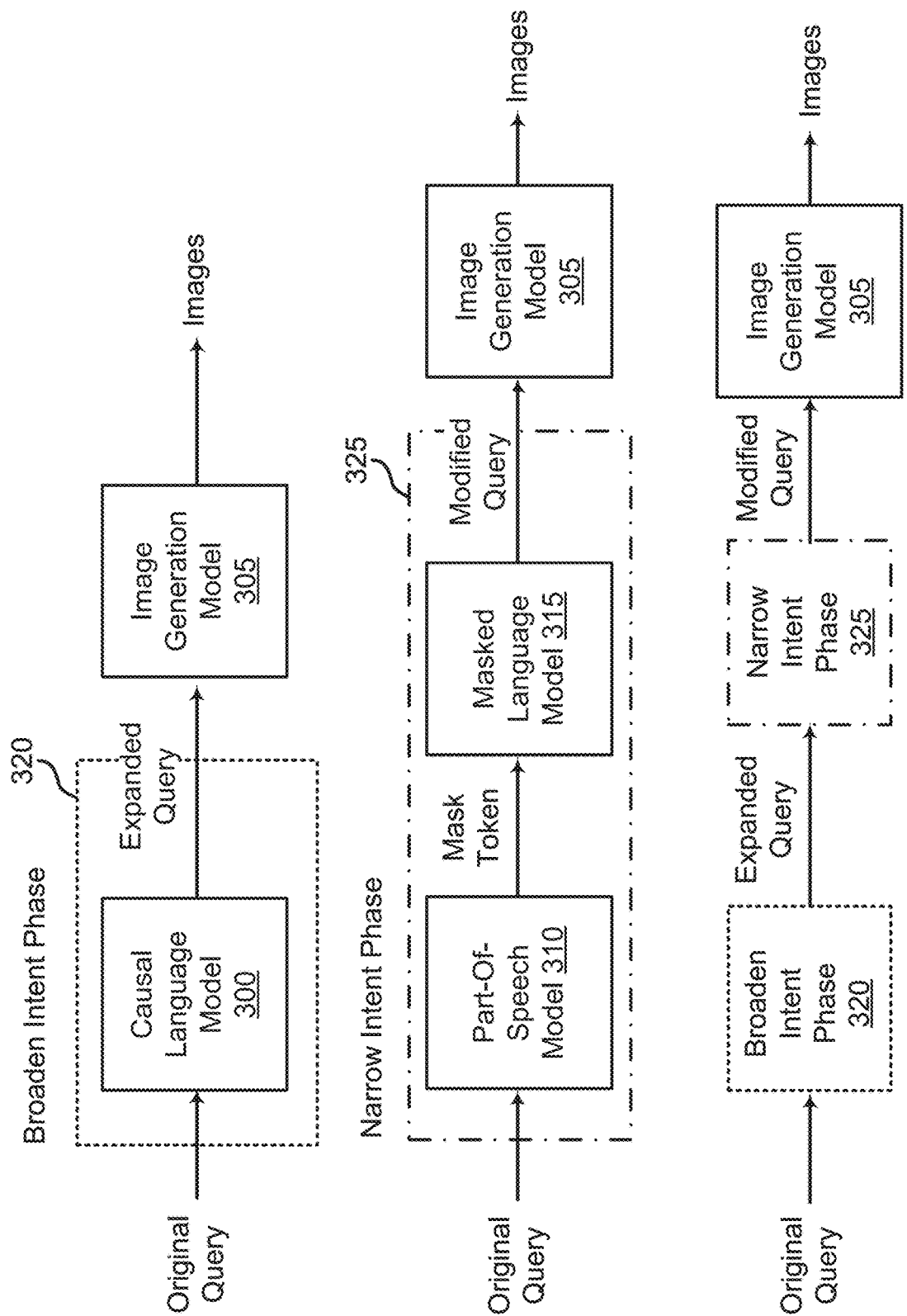
FIG. 3 shows an example of a machine learning model according to aspects of the present disclosure.

In FIGS. 1-3, an apparatus and method for query processing are described. One or more embodiments of the apparatus and method include a processor; a memory including instructions executable by the processor; a CLM configured to generate an expanded query based on an original query; and an MLM configured to replace a mask token in the expanded query with an insertion phrase to obtain a modified query.

Some examples of the apparatus and method further include a tokenizer configured to generate a token corresponding to each of a plurality of phrases in the original query. Some examples of the apparatus and method further include an image generation model configured to generate a plurality of images in response to the original query, wherein the plurality of images are based on the expanded query.

Some examples of the apparatus and method further include a search interface configured to retrieve a search result based on the modified query. In some examples, the CLM includes a transformer model trained to predict a next phrase based on the original query. In some examples, the MLM includes a transformer model trained to predict the insertion phrase corresponding to the mask token based on the expanded query.

FIG. 1 shows an example of a query processing system according to aspects of the present disclosure. The example shown includes user 100, user device 105, query processing apparatus 110, cloud 115, and database 120. Query processing apparatus 110 is an example of, or includes aspects of, the corresponding element described with reference to FIG. 2.

As an example shown in FIG. 1, user 100 enters an original query via user device 105. The original query recites "watercolor illustration of a flower". The original query is transmitted to query processing apparatus 110, e.g., via cloud 115. Query processing apparatus 110 generates a set of additional phrases using a causal language model based on the original query. Query processing apparatus 110 augments the original query with the additional phrase, "in a pot" to obtain an expanded query "watercolor illustration of a flower in a pot".

Query processing apparatus 110 inserts a mask token at a target location of the expanded query, e.g., before the word "pot". A masked language model of query processing apparatus 110 replaces the mask token with an insertion phrase "clay" to obtain a modified query "watercolor illustration of a flower in a clay pot". In some examples, a user interface of user device 105 receives the original query from user 100 and receives a user input indicating the target location, where a mask token is to be inserted.

Query processing apparatus 110 provides a set of images in response to the original query. The images are associated with the modified query (e.g., the images depict content of the modified query such as objects and their relations). Query processing apparatus 110 may retrieve the images from database 120 based on the modified query. The images are displayed to user 100, e.g., via cloud 115 and user device 105. In some cases, an image generation model (e.g., a text to image model) generates a set of images in response to the original query. The set of images are associated with the expanded query or the modified query.

User device 105 may be a personal computer, laptop computer, mainframe computer, palmtop computer, personal assistant, mobile device, or any other suitable processing apparatus. In some examples, user device 105 includes software that incorporates a query processing application. In some examples, the query processing application on user device 105 may include functions of query processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Query processing apparatus 110 includes a computer implemented network comprising tokenizer, causal language model, masked language model, image generation model, and search interface. Query processing apparatus 110 may also include a processor unit, a memory unit, an I/O module, and a training component. The training component is used to train a machine learning model (or a query processing network). Additionally, query processing apparatus 110 can communicate with database 120 via cloud 115. In some cases, the architecture of the query processing network is also referred to as a network or a network model. Further detail regarding the architecture of query processing apparatus 110 is provided with reference to FIGS. 2-3. Further detail regarding the operation of query processing apparatus 110 is provided with reference to FIGS. 4-14.

In some cases, query processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of a query processing apparatus according to aspects of the present disclosure. The example shown includes query processing apparatus 200, processor unit 205, memory unit 210, I/O module 215, training component 220, and machine learning model 225. In one embodiment, machine learning model 225 includes tokenizer 230, causal language model 235, masked language model 240, image generation model 245, and search interface 250. Query processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

In some examples, training component 220 is configured to train machine learning model 225. In some embodiments, training component 220 trains two separate tokenizers based on byte-pair encoding (BPE) tokenization for causal language model 235 and masked language model 240, respectively. In some examples, the vocabulary size of the tokenizers is 120k. For example, masked language model 240 is based on Roberta model. Masked language model 240 is trained on a customized dataset. For causal language model 235 (e.g., GPT2), the model size is reduced, and six layers are used to efficiently manage training resource. Other model parameters are not changed. Causal language model 235 performs text completion and masked language model 240 fills in the mask within a caption. Embodiments of the present disclosure may include or use other text to image generation model. In some examples, training component 220 is part of another apparatus other than query processing apparatus 200.

According to some embodiments of the present disclosure, query processing apparatus 200 includes a computer implemented artificial neural network (ANN) for augmenting an original query with an additional phrase to obtain an expanded query. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of machine learning model 225 are adjusted to increase the accuracy of the result (i.e., by attempting to minimize a loss function which corresponds to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, machine learning model 225 encodes the modified query to obtain a modified query embedding. In some examples, machine learning model 225 compares the modified query embedding to an image embedding. Machine learning model 225 selects the image based on the comparison, where the image corresponds to the image embedding. Machine learning model 225 is an example of, or includes aspects of, the corresponding element described with reference to FIGS. 5-8.

According to some embodiments, tokenizer 230 tokenizes the original query to obtain a set of original tokens by generating a token that corresponds to each of a plurality of phrases in the original query.

According to some embodiments, causal language model 235 generates a set of expanded queries by generating a set of additional phrases based on the original query and augmenting the original query with each of the set of additional phrases, respectively. In some examples, causal language model 235 generates a sequence of tokens, where each token of the sequence of tokens is generated based on the set of original tokens and a sequence of previously generated tokens, where a final token indicates an end of the sequence of tokens, and where an additional phrase of the set of additional phrases is generated based on the sequence of tokens.

According to some embodiments, causal language model 235 generates an expanded query based on the original query. In some examples, causal language model 235 augments the original query using the sequence of tokens to obtain the expanded query. In some examples, causal language model 235 includes a transformer model trained to predict a next phrase based on the original query. In some examples, causal language model 235 includes a generative pre-trained transformer model (e.g., GPT2). Causal language model 235 is an example of, or includes aspects of, the corresponding element described with reference to FIG. 3.

According to some embodiments, masked language model 240 inserts a mask token at a target location of an expanded query of the set of expanded queries. In some examples, masked language model 240 replaces the mask token with an insertion phrase to obtain a modified query.

In some examples, masked language model 240 generates a set of insertion phrases. Masked language model 240 replaces the mask token with each of the set of insertion phrases to obtain a set of modified queries. In some examples, masked language model 240 generates the insertion phrase based on a context of the expanded query. In some examples, masked language model 240 includes a transformer model trained to predict the insertion phrase corresponding to the mask token based on the expanded query. In some embodiments, masked language model 240 includes a RoBERTa model, i.e., a variation of BERT model. Masked language model 240 is an example of, or includes aspects of, the corresponding element described with reference to FIG. 3.

According to an embodiment, masked language model 240 includes a bi-directional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference.

In some examples, the BERT model uses a masked language model (i.e., MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bi-directional transformer. In addition to the masked language model, BERT includes a next sentence prediction (NSP) task that jointly pretrains text-pair representations.

According to some embodiments, image generation model 245 is configured to generate a plurality of images in response to the original query, wherein the plurality of images are based on the expanded query. In some examples, image generation model 245 includes a text to image model. Embodiments of the present disclosure are not limited to a particular type of text to image model or contextual text generation model. In some cases, there may not be sufficient training data available. In these cases, open-source models can be fine-tuned on domain data or such models can be used directly. Image generation model 245 is an example of, or includes aspects of, the corresponding element described with reference to FIG. 3.

According to some embodiments, search interface 250 identifies an original query. In some examples, search interface 250 provides a set of images in response to the original query, where the set of images are associated with the set of expanded queries, respectively. In some examples, search interface 250 provides an image based on the modified query. In some examples, search interface 250 provides a set of images based on the set of modified queries, respectively.

In some examples, search interface 250 receives a user input indicating the target location. In some examples, search interface 250 provides an additional set of images based on the set of modified queries, respectively. According to some embodiments, search interface 250 is configured to retrieve a search result based on the modified query.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a machine learning model according to aspects of the present disclosure. The example shown includes causal language model 300, image generation model 305, part-of-speech model 310, masked language model 315, broaden intent phase 320, and narrow intent phase 325.

As an example illustrated in FIG. 3, from left to right, an original query is input to causal language model 300. Causal language model 300 generates an expanded query based on the original query. This process may be referred to as broaden intent phase 320. Causal language model 300 is an example of, or includes aspects of, the corresponding element described with reference to FIG. 2. Broaden intent phase 320 is an example of, or includes aspects of, the corresponding element described with reference to FIGS. 9 and 10.

According to an embodiment, the expanded query is input to image generation model 305. Image generation model 305 generates one or more images that depict the expanded query. Image generation model 305 is an example of, or includes aspects of, the corresponding element described with reference to FIG. 2.

According to an embodiment, an original query is input to part-of-speech model 310. Part-of-speech model 310 identifies a category of a word in an expanded query of the set of expanded queries. Part-of-speech model 310 identifies a target location of the expanded query based on the category of the word. Part-of-speech model 310 outputs a mask token, which is input to masked language model 315.

In some examples, prompt variations are generated by adding text within the user prompt (i.e., the original query). Part-of-speech (POS) can be implemented using spaCy, i.e., a library written in Python®. Mask tokens are added individually before nouns or adjectives in the original query. POS tagging in natural language processing (NLP) is a process of reading text and assigning parts of speech to each word or token, such as noun, verb, adjective, etc. POS tagging is used to identify one or more entities in the given sentence. Each prompt with a <mask> token is input to masked language model 315 to generate prompt variations.

According to an embodiment, masked language model 315 replaces the mask token with an insertion phrase to obtain a modified query. This process may be referred to as narrow intent phase 325. Masked language model 315 is an example of, or includes aspects of, the corresponding element described with reference to FIG. 2. Narrow intent phase 325 is an example of, or includes aspects of, the corresponding element described with reference to FIGS. 9 and 10. The generated prompts (i.e., modified queries) help narrow user's scope and help users edit or choose specific entities in their images.

According to an embodiment, the modified query is input to image generation model 305. Image generation model 305 generates one or more images that relate to the modified query. Image generation model 305 is an example of, or includes aspects of, the corresponding element described with reference to FIG. 2.

According to an embodiment, an original query is input to broaden intent phase 320. The machine learning model, via broaden intent phase 320, generates an alternative query. The alternative query is input to narrow intent phase 325. The machine learning model, via narrow intent phase 325, generates a modified query. The modified query is input to image generation model 305. Image generation model 305 generates one or more images related to or depict the modified query.

In some examples, causal language model 300 and masked language model 315 are used together. A user can expand on their prompt using causal language model 300. Based on the results, if the user is interested to explore one of the generated images (e.g., they select that image), the caption for it can be edited with <mask>. Masked language model 315 provides images, via database retrieval or text to image generation, with variations of entities for that specific prompt.

In some examples, a user inputs an original prompt in a query box. The query processing apparatus generates a background based on the input prompt. A user suggests additional prompts and selects text generation model to be "AutoComplete Model" (broaden intent) or "Fill in the Blanks Model" model (narrow intent) to generate prompt expansion and corresponding images. If a user chooses the Fill in the Blanks Model model, a user can then select MLM input to decide the position of a mask token.

For example, an original query is "abstract mosaic pattern background". The query processing apparatus generates a corresponding image based on the original query. If a user chooses the AutoComplete Model, the query processing apparatus generates the following prompts and corresponding images. The generated prompts include "abstract mosaic pattern background geometric polygon design set", "abstract mosaic pattern background illustration green colors", "abstract mosaic pattern background with stripes", "abstract mosaic pattern background with green gray", "abstract mosaic pattern background seamless geometric pattern design", "abstract mosaic pattern background design", "abstract mosaic pattern background old vintage style", "abstract mosaic pattern background—black and white vector graphic", etc.

In some examples, a user changes the input prompt to "abstract mosaic pattern background illustration green colors" and chooses Fill in the Blanks Model. The input to masked language model 315 is "abstract mosaic <mask> pattern background illustration green colors". Masked language model 315 generates the following prompts and corresponding images (e.g., via image generation model 305). The modified queries include "abstract mosaic seamless pattern background illustration green colors", "abstract mosaic square pattern background illustration green colors", "abstract mosaic triangle pattern background illustration green colors", "abstract mosaic tiles pattern background illustration green colors, "abstract mosaic tile pattern background illustration green colors", "abstract mosaic vector pattern background illustration green colors", "abstract mosaic circle pattern background illustration green colors", "abstract mosaic design pattern background illustration green colors", "abstract mosaic geometric pattern background illustration green colors", "abstract mosaic dot pattern background illustration green colors", etc.

Query Processing

In FIGS. 4-14, a method, apparatus, and non-transitory computer readable medium for query processing are described. One or more embodiments of the method, apparatus, and non-transitory computer readable medium include identifying an original query; generating a plurality of expanded queries by generating a plurality of additional phrases based on the original query using a causal language model (CLM) and augmenting the original query with each of the plurality of additional phrases, respectively; and providing a plurality of images in response to the original query, wherein the plurality of images are associated with the plurality of expanded queries, respectively.

Some examples of the method, apparatus, and non-transitory computer readable medium further include tokenizing the original query to obtain a plurality of original tokens. Some examples further include generating a sequence of tokens using the CLM, wherein each token of the sequence of tokens is generated based on the plurality of original tokens and a sequence of previously generated tokens, wherein a final token indicates an end of the sequence of tokens, and wherein an additional phrase of the plurality of additional phrases is generated based on the sequence of tokens.

Some examples of the method, apparatus, and non-transitory computer readable medium further include inserting a mask token at a target location of an expanded query of the plurality of expanded queries. Some examples further include replacing the mask token with an insertion phrase using a masked language model (MLM) to obtain a modified query. Some examples further include providing an image based on the modified query.

Some examples of the method, apparatus, and non-transitory computer readable medium further include encoding the modified query to obtain a modified query embedding. Some examples further include comparing the modified query embedding to an image embedding. Some examples further include selecting the image based on the comparison, wherein the image corresponds to the image embedding. Some examples of the method, apparatus, and non-transitory computer readable medium further include receiving a user input indicating the target location.

Some examples of the method, apparatus, and non-transitory computer readable medium further include generating a plurality of insertion phrases. Some examples further include replacing the mask token with each of the plurality of insertion phrases to obtain a plurality of modified queries. Some examples further include providing an additional plurality of images based on the plurality of modified queries, respectively.

Some examples of the method, apparatus, and non-transitory computer readable medium further include identifying a category of a word in an expanded query of the plurality of expanded queries using a part-of-speech (POS) model. Some examples further include identifying a target location of the expanded query based on the category of the word.

Some examples of the method, apparatus, and non-transitory computer readable medium further include providing the plurality of images using an image generation model based on the plurality of expanded queries, respectively.

A method, apparatus, and non-transitory computer readable medium for query processing are described. One or more embodiments of the method, apparatus, and non-transitory computer readable medium include identifying an original query; generating an expanded query based on the original query using a CLM; inserting a mask token at a target location of the expanded query; replacing the mask token with an insertion phrase using a MLM to obtain a modified query; and providing an image based on the modified query.

Some examples of the method, apparatus, and non-transitory computer readable medium further include tokenizing the original query to obtain a plurality of original tokens. Some examples further include generating a sequence of tokens using the CLM, wherein each token of the sequence of tokens is generated based on the plurality of original tokens and a sequence of previously generated tokens, and wherein a final token indicates an end of the sequence of tokens. Some examples further include augmenting the original query using the sequence of tokens to obtain the expanded query.

Some examples of the method, apparatus, and non-transitory computer readable medium further include identifying a category of a word in the expanded query using a POS model. Some examples further include identifying the target location based on the category of the word.

Some examples of the method, apparatus, and non-transitory computer readable medium further include generating a plurality of insertion phrases. Some examples further include replacing the mask token with each of the plurality of insertion phrases to obtain a plurality of modified queries. Some examples further include providing a plurality of images based on the plurality of modified queries, respectively.

Some examples of the method, apparatus, and non-transitory computer readable medium further include encoding the modified query to obtain a modified query embedding. Some examples further include comparing the modified query embedding to an image embedding. Some examples further include selecting the image based on the comparison, wherein the image corresponds to the image embedding. Some examples of the method, apparatus, and non-transitory computer readable medium further include generating the insertion phrase based on a context of the expanded query.

Figure 4:
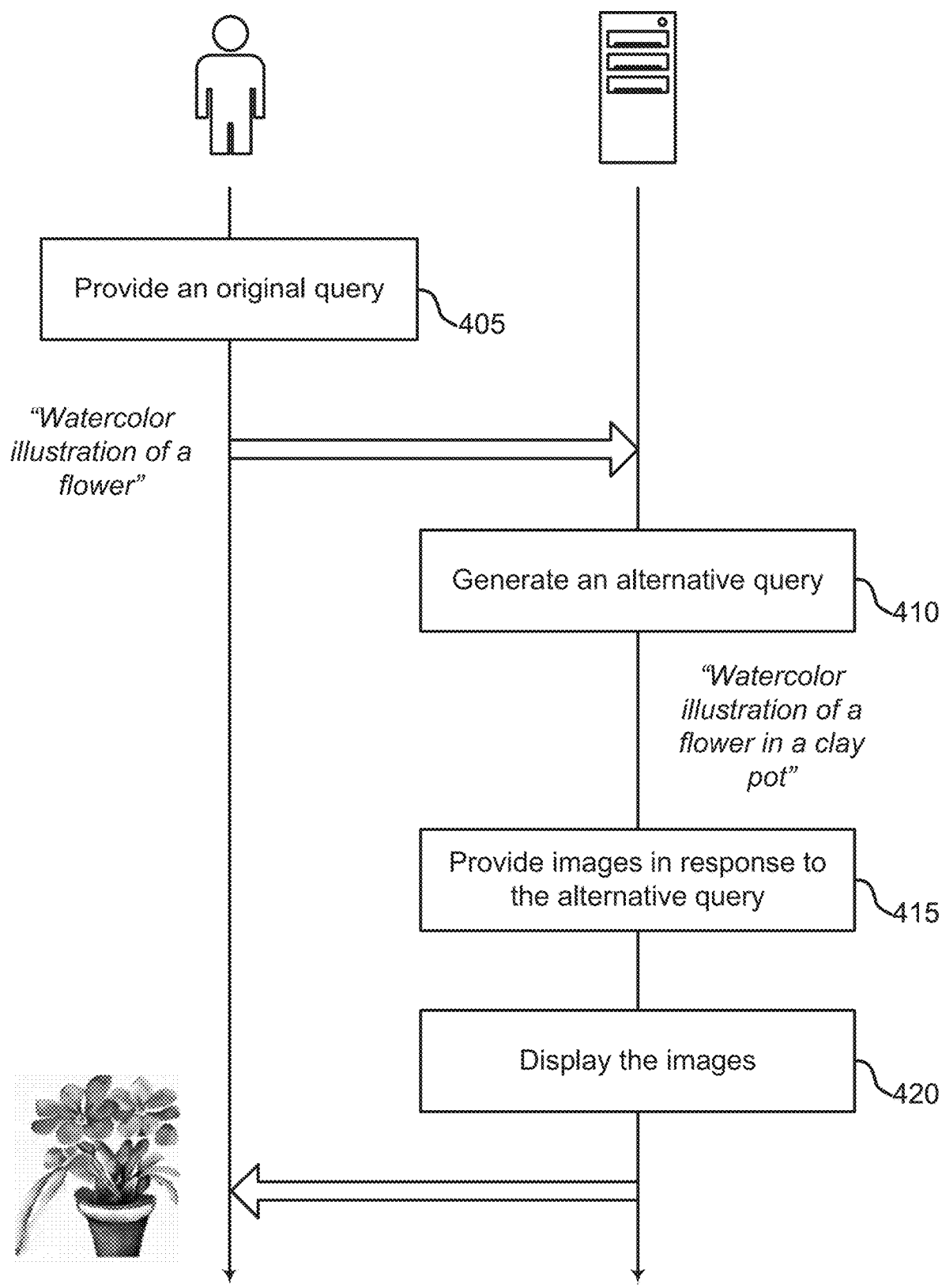
FIG. 4 shows an example of a method for query processing according to aspects of the present disclosure.

FIG. 4 shows an example of query processing according to aspects of the present disclosure. In some examples, these operations are performed by a system including a processor executing a set of codes to control functional elements of an apparatus, such as query processing apparatus 200 as shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides an original query. In some cases, the operations of this step refer to, or may be performed by, a user as described with reference to FIG. 1. In some examples, the user uploads the original query via a query upload element of a user interface. The original query recites "watercolor illustration of a flower." The original query is transmitted to a query processing apparatus.

At operation 410, the system generates an alternative query based on the original query. In some cases, the operations of this step refer to, or may be performed by, a query processing apparatus as described with reference to FIGS. 1 and 2. In some examples, a query processing apparatus generates a set of additional phrases using a causal language model based on the original query. The query processing apparatus augments the original query with the set of additional phrases, respectively. This may be referred to as "broaden intent phase". Here, an additional phrase "in a pot" is added to obtain an expanded query "watercolor illustration of a flower in a pot". In this example, the query processing apparatus also replace a mask token at a target location with an insertion phrase using a masked language model to obtain a modified query. This may be referred to as "narrow intent phase". In an example, the query processing apparatus, via the combination of the broaden and narrow phases, generates alternative queries.

At operation 415, the system provides a set of images in response to the alternative query. In some cases, the operations of this step refer to, or may be performed by, a query processing apparatus as described with reference to FIGS. 1 and 2. The images are associated with the alternative query (e.g., the images depict objects and their relations in the alternative query). In some examples, the query processing apparatus retrieves the images from a database based on the alternative query. The images are returned to a user via a cloud and a user device. In some cases, an image generation model (e.g., text to image model) generates the set of images in response to the alternative query.

At operation 420, the system displays the set of images. In some cases, the operations of this step refer to, or may be performed by, a query processing apparatus as described with reference to FIGS. 1 and 2. In some examples, the images are displayed on a search interface (e.g., the images are search result from a search engine).

The query processing apparatus generates variations for images based on text variations that can both broaden and narrow intent. Non-generative model parameters (e.g., seed, conditioning) induce variations that can be UI controlled for increased user control.

Figure 5:
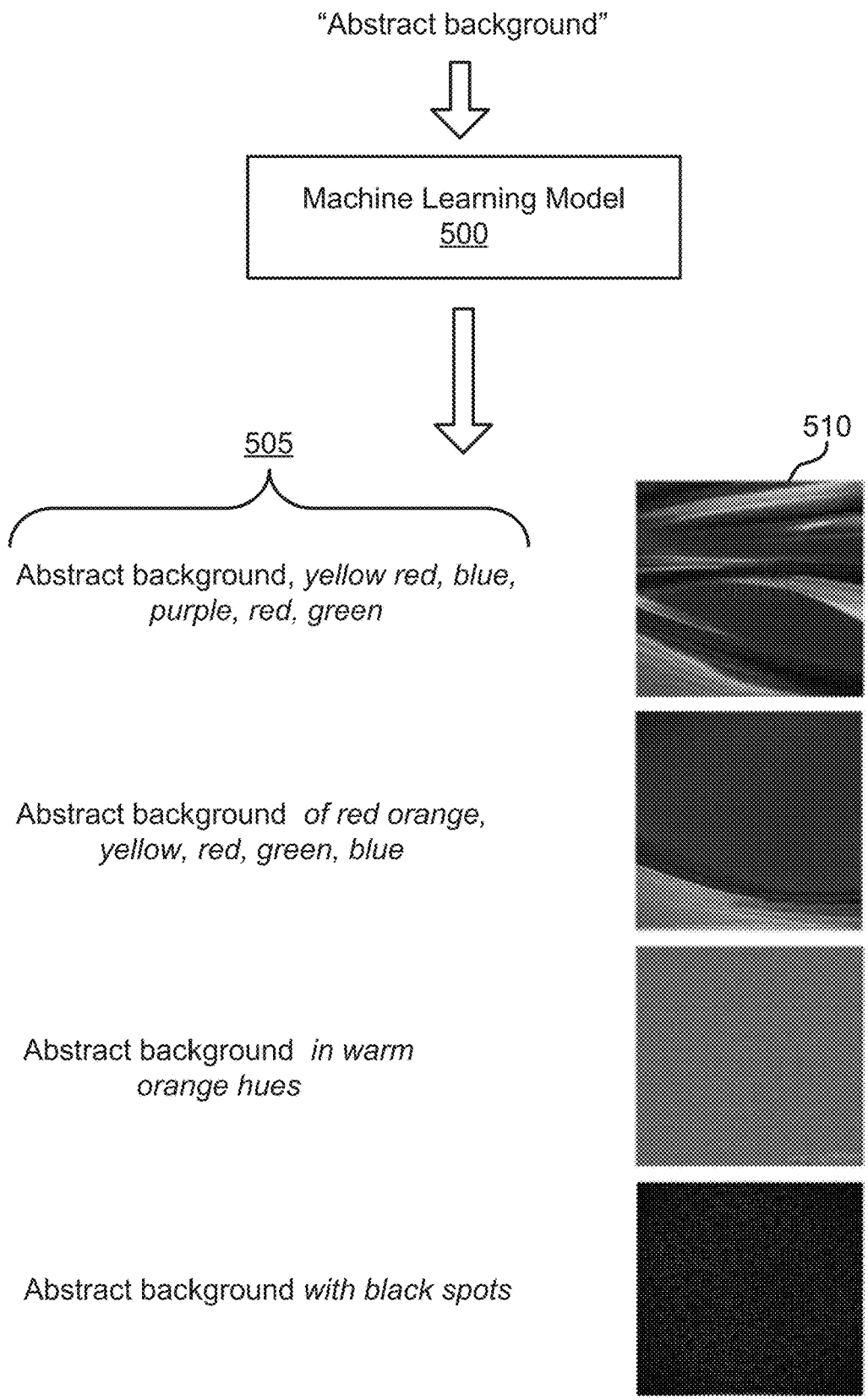
FIGS. 5 and 6 show examples of query augmentation according to aspects of the present disclosure.

FIG. 5 shows an example of query augmentation according to aspects of the present disclosure. The example shown includes machine learning model 500, expanded query 505, and image 510. Machine learning model 500 is an example of, or includes aspects of, the corresponding element described with reference to FIGS. 2, and 6-8. Expanded query 505 is an example of, or includes aspects of, the corresponding element described with reference to FIG. 6.

In some examples, an original query or input prompt is "abstract background". Machine learning model 500 generates a set of expanded queries 505. In some cases, an expanded query may also be referred to as an expanded prompt. Expanded queries 505 include "abstract background of a white plate with a shadow", "abstract background, light steel structure", "abstract background with blue stripes", "abstract background, yellow red, blue, purple, purple, red, green", "abstract background of red orange, yellow, red, green, blue", "abstract background in warm orange hues", "abstract background with black spots", "abstract background of small pink roses and purple orchids", "abstract background with a white and pink pattern for decorative design", "abstract background of blue and purple rays", etc. At least one image 510 is provided for each of the expanded queries 505. In the above examples, machine learning model 500 inserts an additional phrase at the end of the original query.

Figure 6:
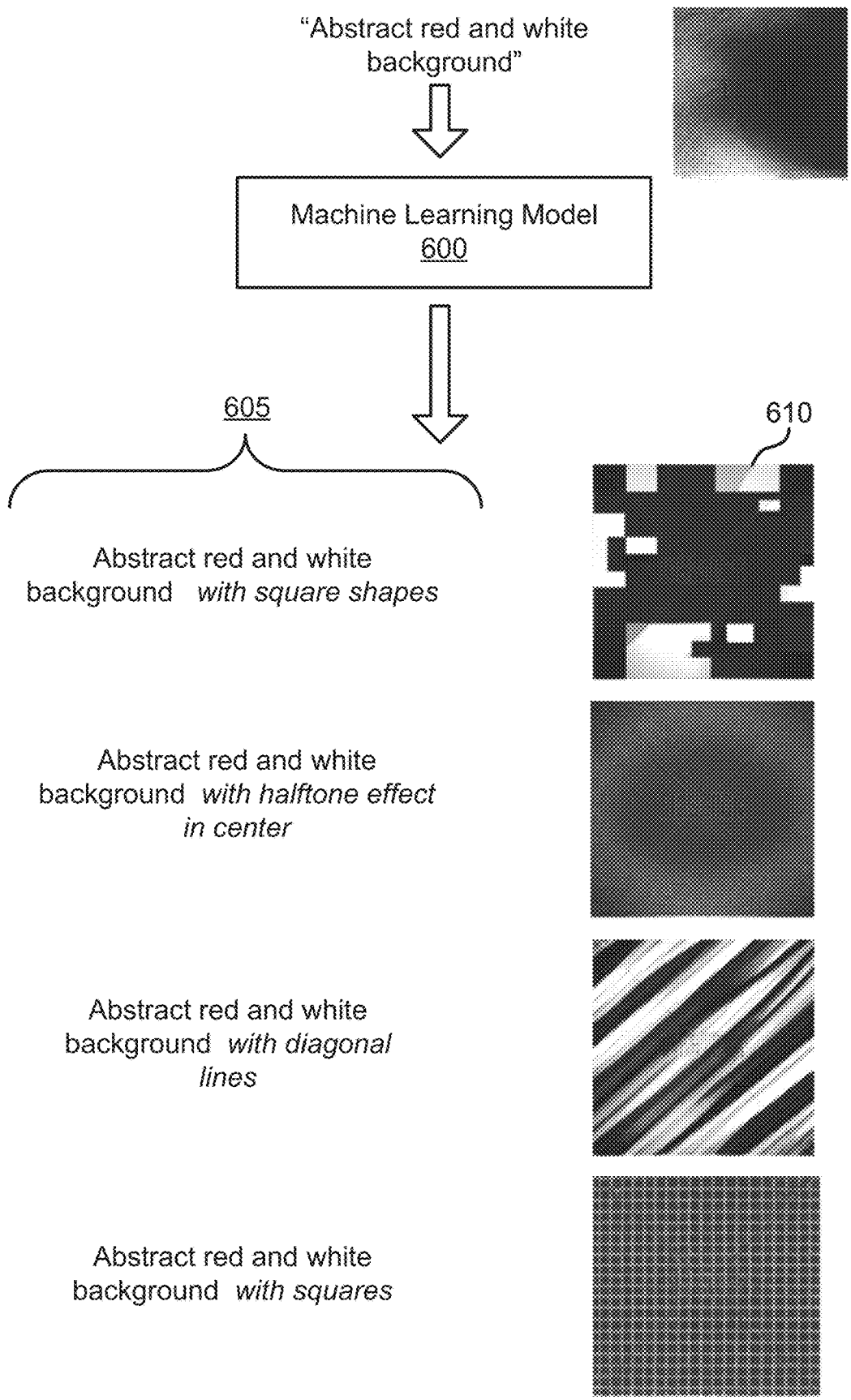

FIG. 6 shows an example of query augmentation according to aspects of the present disclosure. The example shown includes machine learning model 600, expanded query 605, and image 610. Machine learning model 600 is an example of, or includes aspects of, the corresponding element described with reference to FIGS. 2, 5, 7, and 8. Expanded query 605 is an example of, or includes aspects of, the corresponding element described with reference to FIG. 5.

In some examples, an original query or input prompt is "abstract red and white background". Machine learning model 600 generates a set of expanded queries 605. Expanded queries 605 include "abstract red and white background with place for text", "abstract red and white background with square shapes", "abstract red and white background with halftone effect in center", "abstract red and white background with diagonal lines", "abstract red and white background with squares", etc. At least one image 610 is provided for each of the expanded queries 605. In the above examples, machine learning model 600 inserts an additional phrase at the end of the original query.

Figure 7:
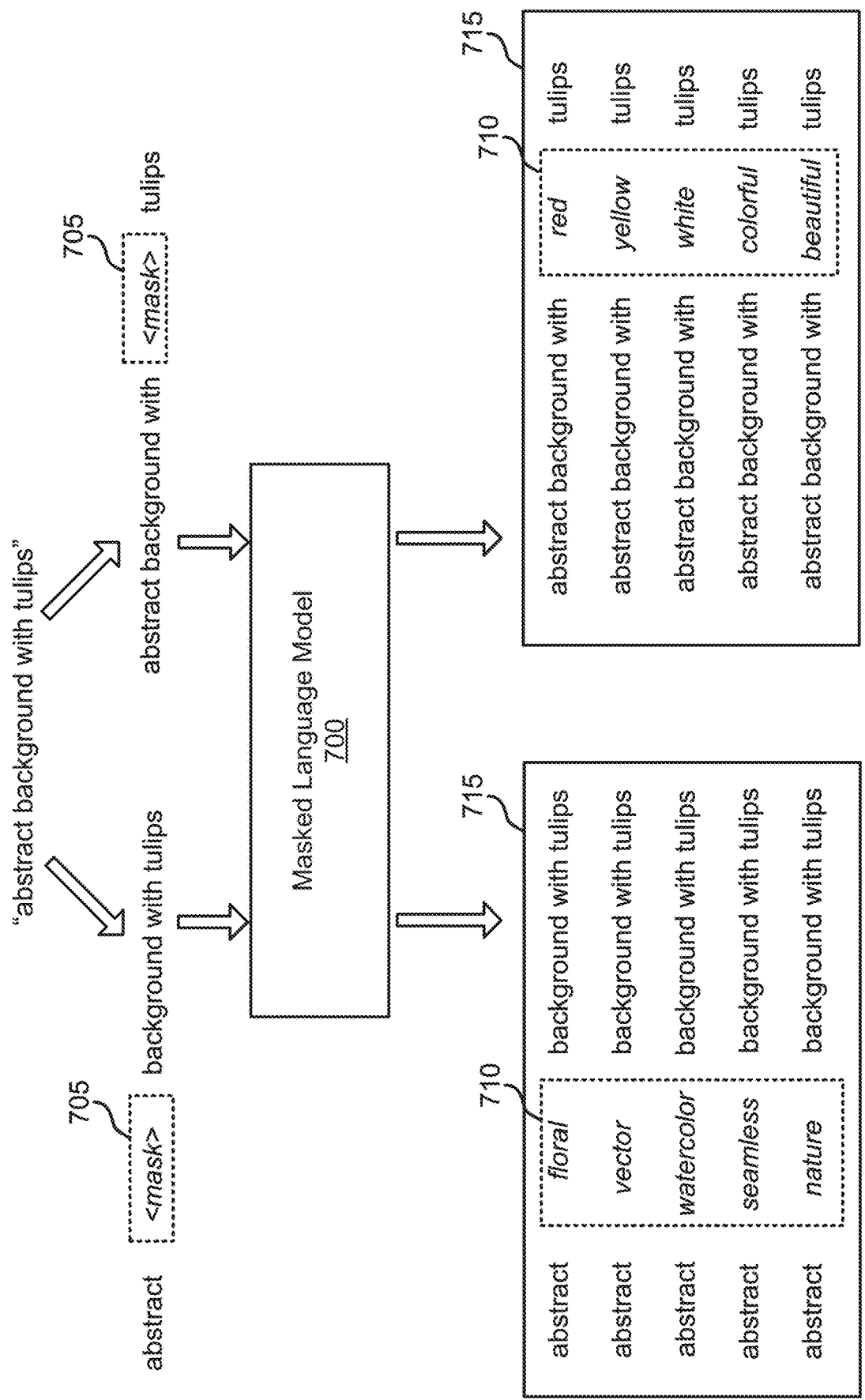
FIG. 7 shows an example of query modification according to aspects of the present disclosure.

FIG. 7 shows an example of query modification according to aspects of the present disclosure. The example shown includes machine learning model 700, mask token 705, insertion phrases 710, and modified queries 715. Machine learning model 700 is an example of, or includes aspects of, the corresponding element described with reference to FIGS. 2, 5, 6, and 8. Modified queries 715 is an example of, or includes aspects of, the corresponding element described with reference to FIGS. 8-10.

In some examples, an original query or input prompt is "abstract background with tulips". A mask token (i.e., <mask>) is inserted at a target location of the input prompt. The mask token is inserted at a location after the word "abstract", i.e., "abstract <mask> background with tulips". Machine learning model 700 includes a masked language model. The masked language model replaces the mask token with an insertion phrase to obtain a modified query. That is, machine learning model 700 generates a set of prompt variations based on the original query and the location of the mask token. In some examples, the modified queries include "abstract floral background with tulips", "abstract vector background with tulips", "abstract watercolor background with tulips", "abstract seamless background with tulips", "abstract nature background with tulips", etc.

In some examples, a mask token is inserted at a different location of the original query. The mask token is inserted at a location before the word "tulips", i.e., "abstract background with <mask> tulips". The original query including the inserted mask token is input to machine learning model 700. In some examples, the modified queries include "abstract background with red tulips", "abstract background with yellow tulips", "abstract background with white tulips", "abstract background with colorful tulips", "abstract background with beautiful tulips", etc.

Figure 8:
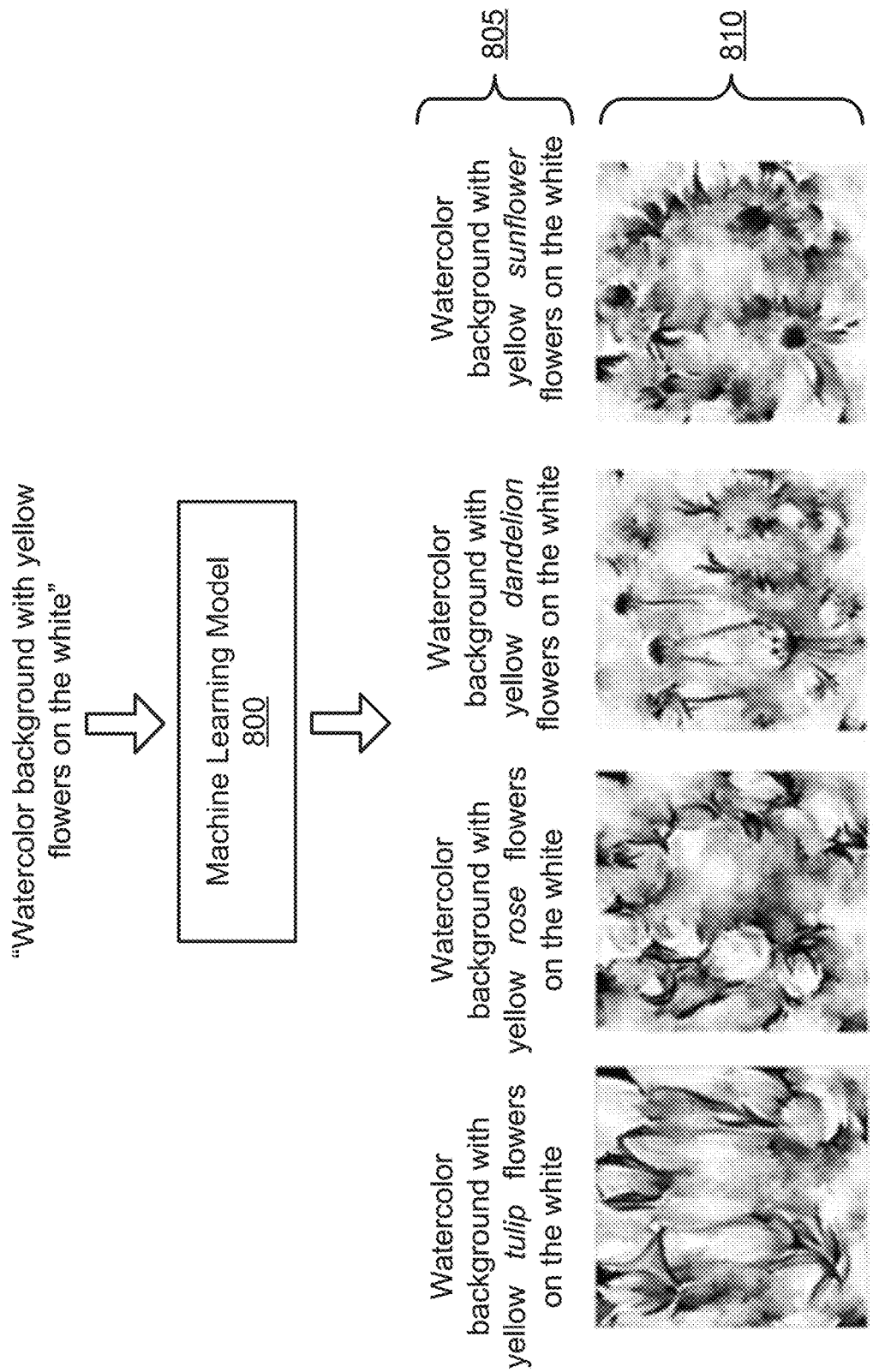
FIG. 8 shows an example of image generation based on a modified query according to aspects of the present disclosure.

FIG. 8 shows an example of image generation based on a modified query according to aspects of the present disclosure. The example shown includes machine learning model 800, modified queries 805, and images 810. Machine learning model 800 is an example of, or includes aspects of, the corresponding element described with reference to FIGS. 2, and 5-7. Modified queries 805 is an example of, or includes aspects of, the corresponding element described with reference to FIGS. 7, 9, and 10.

As an example illustrated in FIG. 8, input query is "watercolor background with yellow flowers on the white". A mask token is inserted at a target location of the input query. The mask token is inserted before the word "flowers". Machine learning model 800 replaces the mask token with an insertion phrase to obtain one or more modified queries 805. Modified queries 805 include "watercolor background with yellow tulip flowers on the white", "watercolor background with yellow rose flowers on the white", "watercolor background with yellow dandelion flowers on the white", "watercolor background with yellow sunflower flowers on the white", etc. Machine learning model 800 provides images 810 based on modified queries 805.

Figure 9:
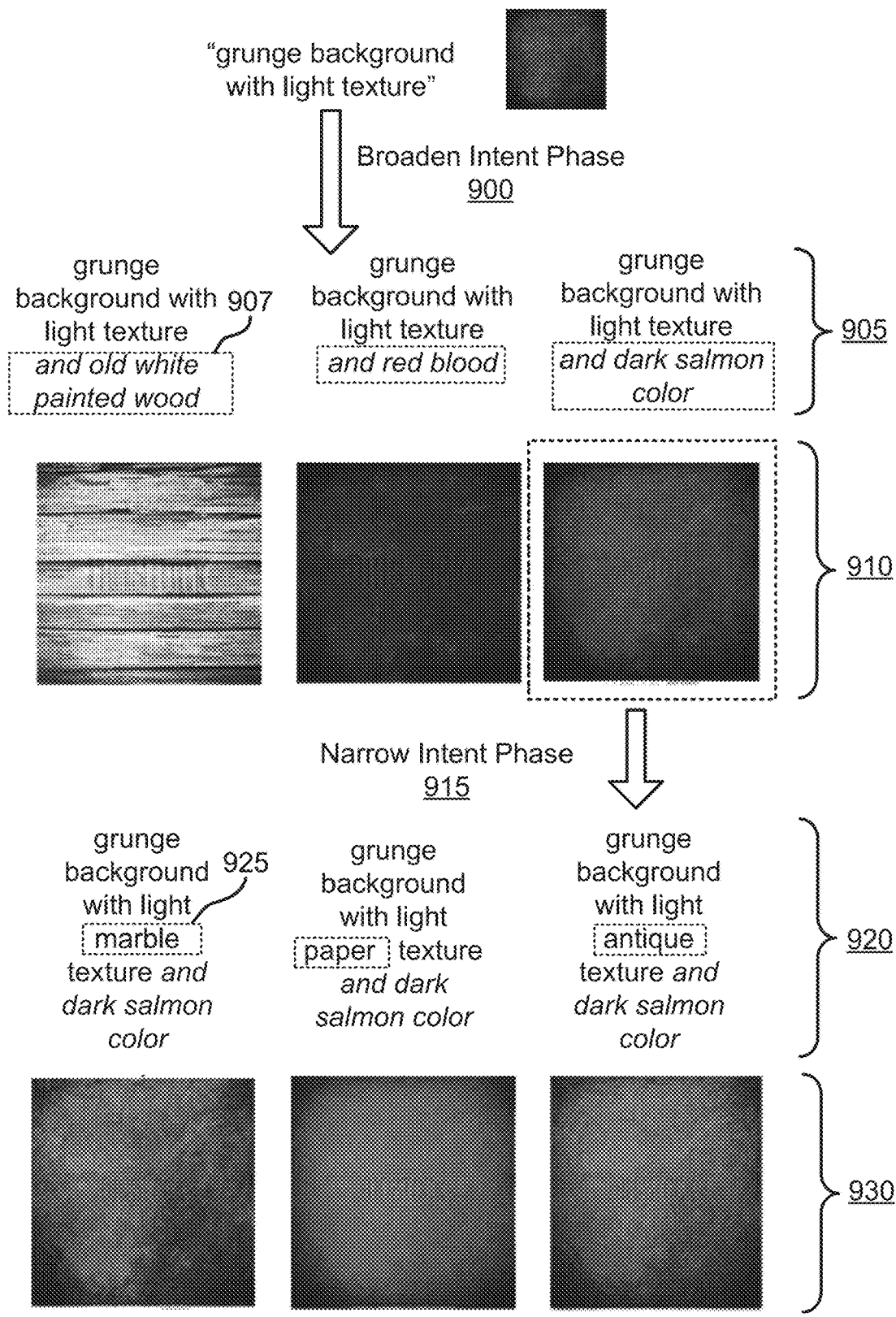
FIGS. 9 and 10 show examples of providing images based on alternative queries according to aspects of the present disclosure.

FIG. 9 shows an example of providing images based on alternative queries according to aspects of the present disclosure. The example shown includes broaden intent phase 900, expanded queries 905, additional phrase 907, first images 910, narrow intent phase 915, modified queries 920, insertion phrase 925, and second images 930. Broaden intent phase 900 is an example of, or includes aspects of, the corresponding element described with reference to FIGS. 3 and 10. Narrow intent phase 915 is an example of, or includes aspects of, the corresponding element described with reference to FIGS. 3 and 10.

In some examples, an input prompt is "grunge background with light texture". At broaden intent phase 900, the machine learning model generates the following expanded queries 905 and corresponding first images 910. Expanded queries 905 include "grunge background with light texture and blue stains", "grunge background with light texture and black spots", "grunge background with light texture and old white painted wood", "grunge background with light texture and red blood", "grunge background with light texture and dark salmon color", etc. For example, additional phrase 907 is "and old white painted wood" in the expanded query "grunge background with light texture and old white painted wood".

In some examples, the machine learning model takes "grunge background with light texture and dark salmon color" as an input prompt at narrow intent phase 915 and generates the following modified queries 920 and corresponding second images 930. A mask token is inserted at a location before the word "texture". Modified queries 920 include "grunge background with light wooden texture and dark salmon color", "grunge background with light stone texture and dark salmon color", "grunge background with light marble texture and dark salmon color", "grunge background with light paper texture and dark salmon color", "grunge background with light antique texture and dark salmon color", etc. In the above examples, the machine learning model replaces the mask token with an insertion phrase 925 to obtain a modified query. Insertion phrase 925 is "marble" in the modified query "grunge background with light marble texture and dark salmon color".

Expanded queries 905 is an example of, or includes aspects of, the corresponding element described with reference to FIG. 10. Modified queries 920 is an example of, or includes aspects of, the corresponding element described with reference to FIGS. 7, 8, and 10. Insertion phrase 925 is an example of, or includes aspects of, the corresponding element described with reference to FIG. 10.

Figure 10:
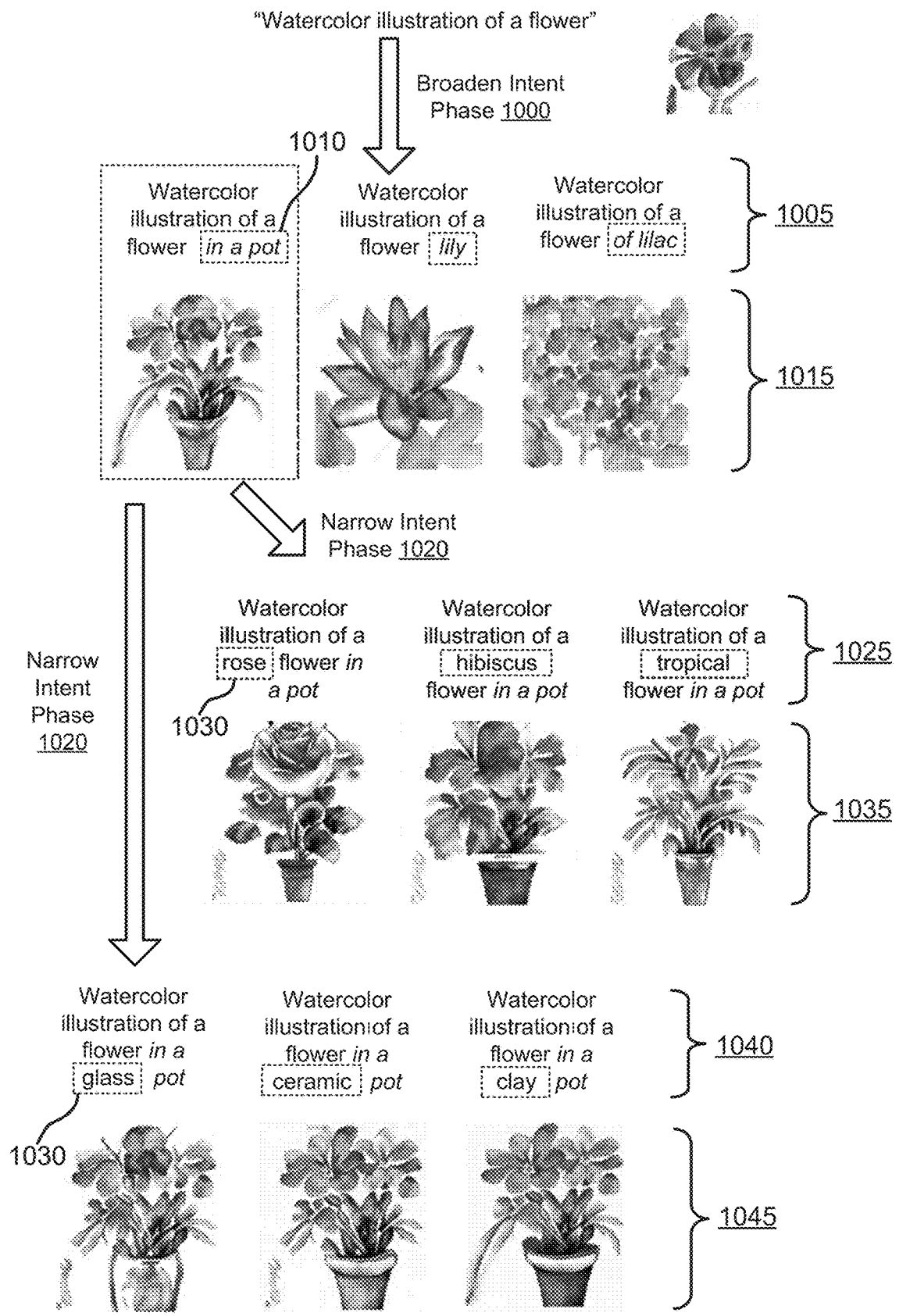

FIG. 10 shows an example of for providing images based on alternative queries according to aspects of the present disclosure. The example shown includes broaden intent phase 1000, expanded queries 1005, additional phrases 1010, first images 1015, narrow intent phase 1020, modified queries 1025, insertion phrase 1030, second images 1035, additional modified queries 1040, and third images 1045. Broaden intent phase 1000 is an example of, or includes aspects of, the corresponding element described with reference to FIGS. 3 and 9. Narrow intent phase 1020 is an example of, or includes aspects of, the corresponding element described with reference to FIGS. 3 and 9.

In some examples, an input prompt is "watercolor illustration of a flower". At broaden intent phase 1000, the machine learning model generates the following expanded queries 1005 and corresponding first images 1015. Expanded queries 1005 include "watercolor illustration of a flower, leaves and branches", "watercolor illustration of a flower in a vase on a black background", "watercolor illustration of a flower in a pot", "watercolor illustration of a flower lily", "watercolor illustration of a flower of lilac", etc. For example, in the expanded query "watercolor illustration of a flower in a pot", additional phrase 1010 is "in a pot".

In some examples, the machine learning model takes "watercolor illustration of a flower in a pot" as an input prompt at narrow intent phase 1020 and generates the following modified queries 1025 and corresponding second images 1035. A mask token is inserted at a location before the word "flower". Modified queries 1025 include "watercolor illustration of a rose flower in a pot", "watercolor illustration of a hibiscus flower in a pot", "watercolor illustration of a tropical flower in a pot", "watercolor illustration of a yellow flower in a pot", "watercolor illustration of a pink flower in a pot", etc. For example, in the modified query "watercolor illustration of a rose flower in a pot", insertion phrase 1030 is "rose".

In a similar example, the machine learning model takes "watercolor illustration of a flower in a pot" as an input prompt at narrow intent phase 1020 and generates the following additional modified queries 1040, and third images 1045. A mask token is inserted at a location before the word "pot". Additional modified queries 1040 include "watercolor illustration of a flower in a glass pot", "watercolor illustration of a flower in a ceramic pot", "watercolor illustration of a flower in a clay pot", "watercolor illustration of a flower in a metal pot", "watercolor illustration of a flower in a black pot", etc. For example, in the modified query "watercolor illustration of a flower in a glass pot", insertion phrase 1030 is "glass".

Expanded queries 1005 is an example of, or includes aspects of, the corresponding element described with reference to FIG. 9. Modified queries 1025 is an example of, or includes aspects of, the corresponding element described with reference to FIGS. 7-9. Insertion phrase 1030 is an example of, or includes aspects of, the corresponding element described with reference to FIG. 9.

Figure 11:
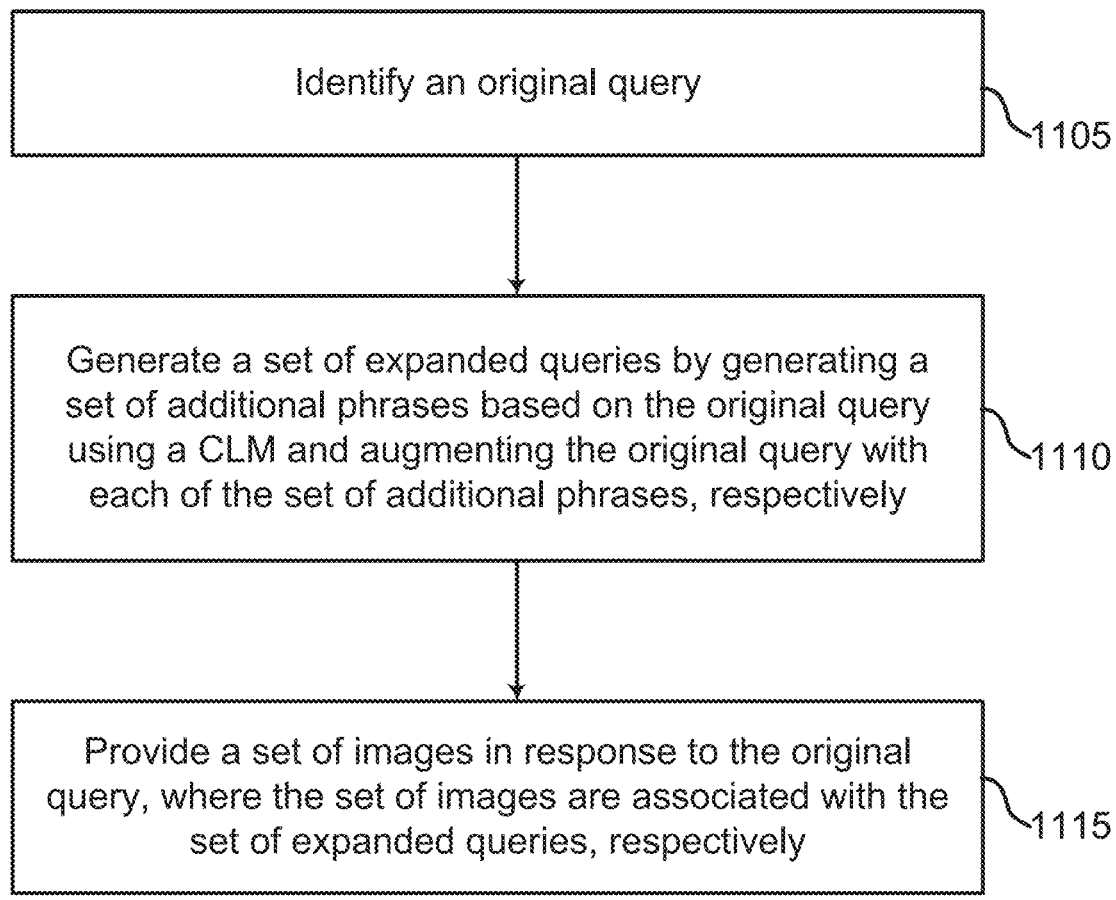
FIGS. 11-14 show examples of methods for query processing according to aspects of the present disclosure.

FIG. 11 shows an example of a method for query processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies an original query. In some cases, the operations of this step refer to, or may be performed by, a search interface as described with reference to FIG. 2. In some examples, a user inputs an original query via a search interface (e.g., text prompt of a search engine).

At operation 1110, the system generates a set of expanded queries by generating a set of additional phrases based on the original query using a CLM and augmenting the original query with each of the set of additional phrases, respectively. In some cases, the operations of this step refer to, or may be performed by, a causal language model as described with reference to FIGS. 2 and 3. According to some embodiments, the causal language model generates a set of prompt variations based on the original query. In some cases, an expanded prompt may be referred to as an expanded query. In some examples, the causal language model includes a generative pre-trained transformer (e.g., GPT2).

According to some embodiments, the causal language model generates variations of user prompt. The machine learning model as shown in FIG. 2 provides an expanded set of images (i.e., more diverse results) based on the set of expanded queries. The causal language model to expand prompts for broadening user intent can be used jointly with a masked language models to edit prompts for narrowing user intent.

Some embodiments of the present disclosure take the original query as input and include a causal language model, a masked language model, or the combination of the two models to generate alternative queries.

At operation 1115, the system provides a set of images in response to the original query, where the set of images are associated with the set of expanded queries, respectively. In some cases, the operations of this step refer to, or may be performed by, a search interface as described with reference to FIG. 2. According to an embodiment, the prompt variations (i.e., the set of expanded queries) are input to an image generation model to generate images corresponding to each of the set of expanded queries. The image results are relatively diverse (e.g., increased variations).

Figure 12:
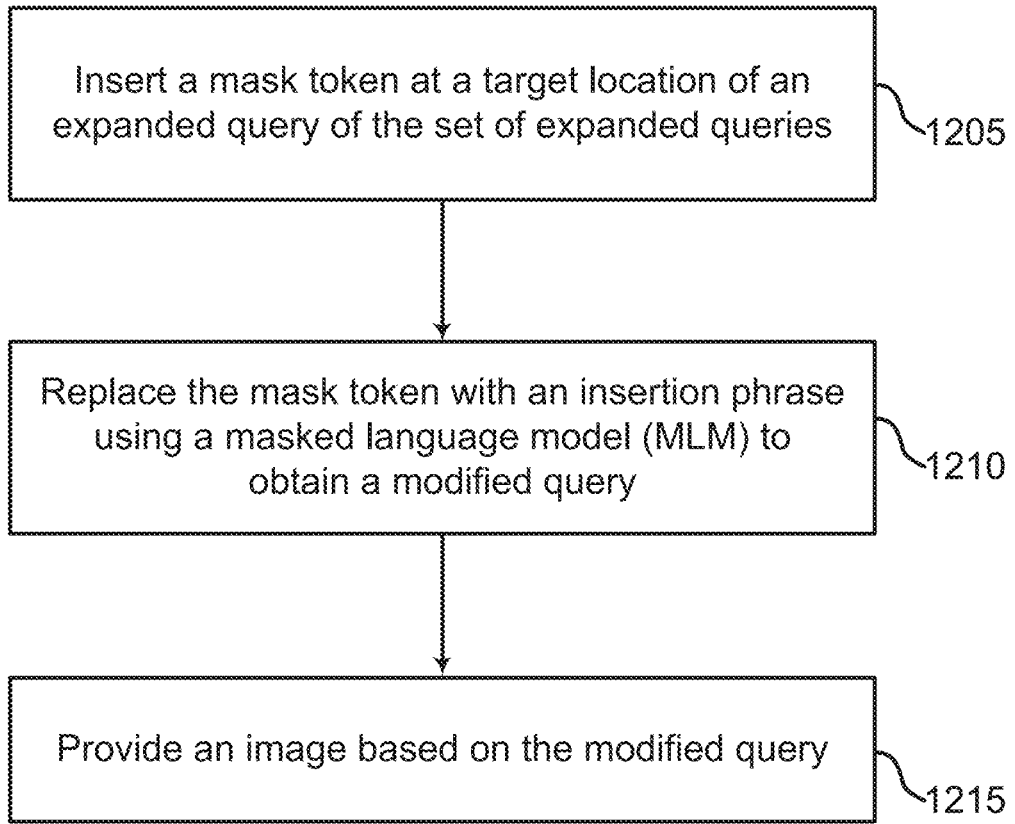

FIG. 12 shows an example of a method for query processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system inserts a mask token at a target location of an expanded query of the set of expanded queries. In some cases, the operations of this step refer to, or may be performed by, a masked language model as described with reference to FIGS. 2 and 3. The mask language model identifies a target location in an expanded query and inserts a mask token or <mask> at the target location.

At operation 1210, the system replaces the mask token with an insertion phrase using a masked language model to obtain a modified query. In some cases, the operations of this step refer to, or may be performed by, a masked language model as described with reference to FIGS. 2 and 3. In some embodiments, the masked language model generates a set of insertion phrases. The masked language model replaces the mask token with each of the set of insertion phrases to obtain a set of modified queries. In some examples, the masked language model generates an insertion phrase based on a context of the expanded query.

In some examples, the masked language model includes a transformer model trained to predict the insertion phrase to replace the mask token. In an embodiment, a masked language model includes a robustly optimized variation of BERT model (e.g., RoBERTa).

At operation 1215, the system provides an image based on the modified query. In some cases, the operations of this step refer to, or may be performed by, a search interface as described with reference to FIG. 2. The image depicts the objects and their relations in the modified query. The query processing apparatus retrieves the image from a database based on the modified query via a search interface. In some examples, an image generation model (e.g., a text to image generation model) generates the image based in the modified query.

Figure 13:
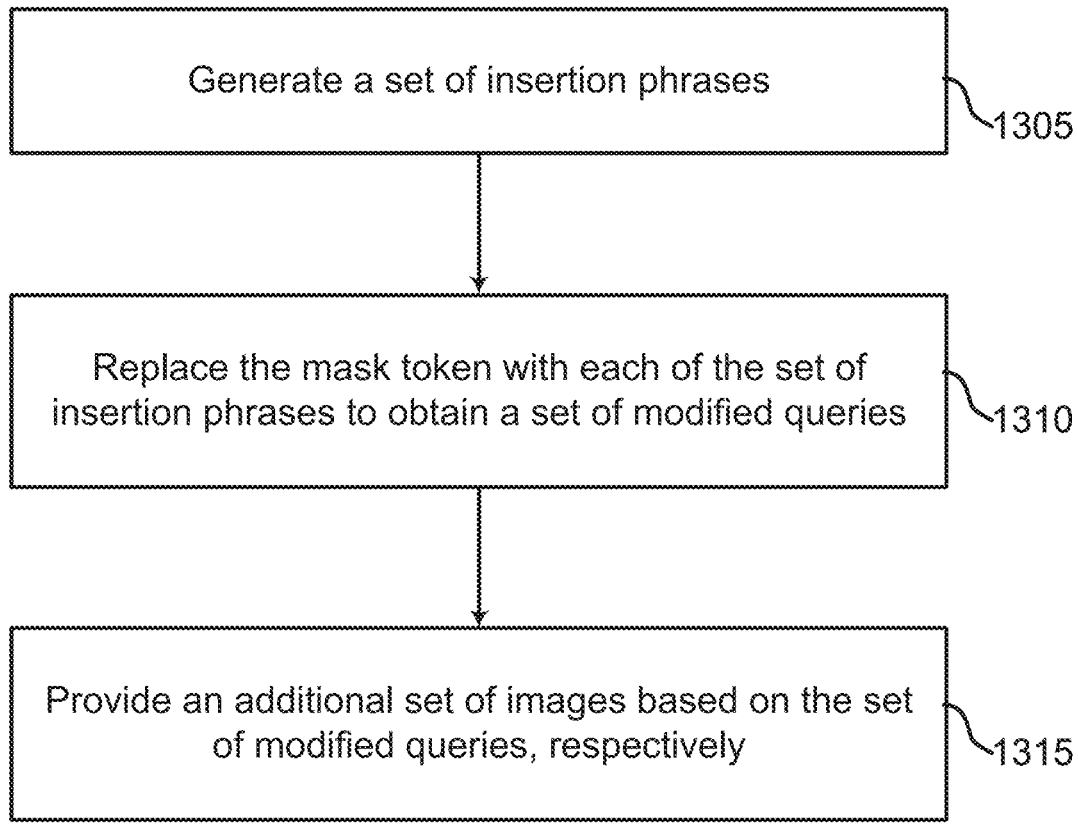

FIG. 13 shows an example of a method for query processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system generates a set of insertion phrases. In some cases, the operations of this step refer to, or may be performed by, a masked language model as described with reference to FIGS. 2 and 3. In some embodiments, the masked language model generates a set of insertion phrases based on a context of the expanded query. In some examples, the masked language model includes a transformer model trained to predict the set of insertion phrases to replace the mask token. The masked language model includes a robustly optimized variation of BERT model (e.g., RoBERTa).

At operation 1310, the system replaces the mask token with each of the set of insertion phrases to obtain a set of modified queries. In some cases, the operations of this step refer to, or may be performed by, a masked language model as described with reference to FIGS. 2 and 3.

At operation 1315, the system provides an additional set of images based on the set of modified queries, respectively. In some cases, the operations of this step refer to, or may be performed by, a search interface as described with reference to FIG. 2. The additional set of images depict the set of modified queries, respectively. In some examples, the search interface retrieves the images from a database based on the modified query. In some cases, an image generation model generates a set of images corresponding to each of the set of the modified queries.

Figure 14:
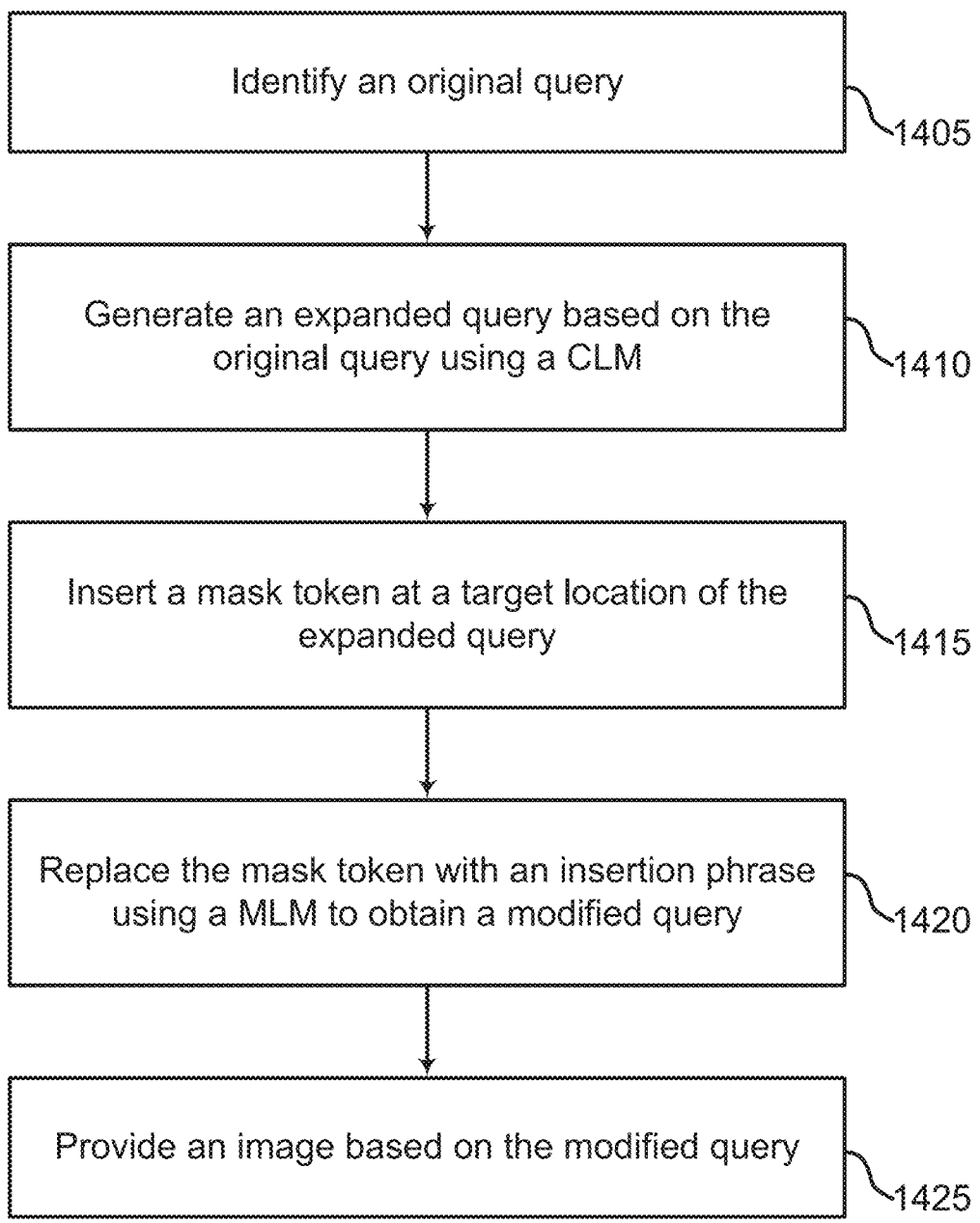

FIG. 14 shows an example of a method for query processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system identifies an original query. In some cases, the operations of this step refer to, or may be performed by, a search interface as described with reference to FIG. 2. In some examples, a user inputs an original query via a search interface (e.g., text prompt of a search engine).

At operation 1410, the system generates an expanded query based on the original query using a CLM. In some cases, the operations of this step refer to, or may be performed by, a causal language model as described with reference to FIGS. 2 and 3. According to some embodiments, the causal language model generates a set of prompt variations based on the original query. In some cases, an expanded prompt may be referred to as an expanded query. In some examples, the causal language model includes a generative pre-trained transformer (e.g., GPT2).

At operation 1415, the system inserts a mask token at a target location of the expanded query. The masked language model identifies a target phrase in an expanded query of the set of expanded queries and insert a mask token or <mask> in place of a target phrase. In some cases, the operations of this step refer to, or may be performed by, a masked language model as described with reference to FIGS. 2 and 3.

At operation 1420, the system replaces the mask token with an insertion phrase using an MLM to obtain a modified query. In some cases, the operations of this step refer to, or may be performed by, a masked language model as described with reference to FIGS. 2 and 3. The masked language model replaces the mask token with the insertion phrase to obtain a modified query. In some examples, the masked language model generates the insertion phrase based on context of the expanded query. In some examples, the masked language model includes a transformer model trained to predict the insertion phrase to replace the mask token. The masked language model includes a RoBERTa model.

At operation 1425, the system provides an image based on the modified query. In some cases, the operations of this step refer to, or may be performed by, a search interface as described with reference to FIG. 2. The image depicts content of the modified query (e.g., objects and their relations). A search interface retrieves the image from a database based on the modified query. In some cases, an image generation model generates the image based on the modified query.

In some examples, a text to image generation model is trained on Adobe® Stock images with a focus on backgrounds. 70 million Adobe® Stock captions are used for training the image generation model. Two separate tokenizers are trained based on byte-pair encoding (BPE) tokenization for the causal language model and the masked language model, respectively. The vocabulary size of the tokenizers is 120 k. The masked language model is based on Roberta model. The masked language model has 258 as position embeddings because caption phrases or sentences are relatively short. The masked language model is trained on a customized dataset. For causal language model (e.g., GPT2), model size is reduced, and six layers are used. Other model parameters are unchanged. According to some embodiments, causal language model is configured for text completion and the masked language model fills in the mask token within a caption. The embodiments of the present disclosure are model agnostic and are not limited to text generation models mentioned above.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   identifying an original query comprising an image description;
   tokenizing the original query to obtain a plurality of original tokens;
   generating a plurality of expanded queries by generating a plurality of additional phrases based on the original query using a causal language model (CLM), wherein each of the plurality of expanded queries comprises an expanded image description that includes the original query and an additional phrase from the plurality of additional phrases, wherein the CLM generates each of the plurality of additional phrases by generating a plurality of sequences of tokens, respectively, and wherein each token of each sequence of the plurality of sequences of tokens is generated based on the plurality of original tokens and a sequence of previously generated tokens;
   inserting a mask token at a target location of each of the plurality of expanded queries;

replacing the mask token with an insertion phrase using a masked language model (MLM) to obtain a plurality of modified queries, respectively; and providing a plurality of images in response to the original query, wherein the plurality of images are associated with the plurality of modified queries, respectively.

2. The method of claim 1, wherein:

a final token indicates an end of each sequence of the plurality of sequences of tokens, and wherein the additional phrase of the plurality of additional phrases is generated based on the sequence of tokens.

3. The method of claim 1, further comprising:

encoding a modified query of the plurality of modified queries to obtain a modified query embedding;

comparing the modified query embedding to an image embedding; and selecting an image of the plurality of images based on the comparison, wherein the image corresponds to the image embedding.

4. The method of claim 1, further comprising:

receiving a user input indicating the target location.

5. The method of claim 1, further comprising:

generating a plurality of insertion phrases;

replacing the mask token with each of the plurality of insertion phrases to obtain the plurality of modified queries; and providing an additional plurality of images based on the plurality of modified queries, respectively.

6. The method of claim 1, further comprising:

identifying a category of a word in an expanded query of the plurality of expanded queries using a part-of-speech (POS) model; and identifying a target location of the expanded query based on the category of the word.

7. The method of claim 1, further comprising:

providing the plurality of images using an image generation model based on the plurality of expanded queries, respectively.

8. A method comprising:

identifying an original query;

tokenizing the original query to obtain a plurality of original tokens;

generating an expanded query based on the plurality of original tokens using a causal language model (CLM) by generating a sequence of tokens, wherein each token of the sequence of tokens is generated based on the plurality of original tokens and a sequence of previously generated tokens;

inserting a mask token at a target location of the expanded query;

replacing the mask token with an insertion phrase using a masked language model (MLM) to obtain a modified query; and providing an image based on the modified query.

9. The method of claim 8, further comprising:

augmenting the original query using the sequence of tokens to obtain the expanded query, wherein a final token indicates an end of the sequence of tokens.

10. The method of claim 8, further comprising:

identifying a category of a word in the expanded query using a part-of-speech (POS) model; and identifying the target location based on the category of the word.

11. The method of claim 8, further comprising:

generating a plurality of insertion phrases;

replacing the mask token with each of the plurality of insertion phrases to obtain a plurality of modified queries; and providing a plurality of images based on the plurality of modified queries, respectively.

12. The method of claim 8, further comprising:

encoding the modified query to obtain a modified query embedding;

comparing the modified query embedding to an image embedding; and selecting the image based on the comparison, wherein the image corresponds to the image embedding.

13. The method of claim 8, further comprising:

generating the insertion phrase based on a context of the expanded query.

14. An apparatus comprising:

a processor;

a memory including instructions executable by the processor;

a causal language model (CLM) configured to generate an expanded query based on an original query comprising an image description, wherein the expanded query comprises an expanded image description that includes the original query and an additional phrase from a plurality of additional phrases, and wherein the CLM generates each of the plurality of additional phrases by generating a plurality of sequences of tokens, respectively, and wherein each token of each sequence of the plurality of sequences of tokens is generated based on a plurality of original tokens and a sequence of previously generated tokens; and a masked language model (MLM) configured to insert a mask token at a target location of the expanded query and replace the mask token in the expanded query with an insertion phrase to obtain a modified query.

15. The apparatus of claim 14, further comprising:

a tokenizer configured to generate a token corresponding to each of a plurality of phrases in the original query.

16. The apparatus of claim 14, further comprising:

an image generation model configured to generate a plurality of images in response to the original query, wherein the plurality of images are based on the expanded query.

17. The apparatus of claim 14, further comprising:

a search interface configured to retrieve a search result based on the modified query.

18. The apparatus of claim 14, wherein:

the CLM includes a transformer model trained to predict a next phrase based on the original query.

19. The apparatus of claim 14, wherein:

the MLM includes a transformer model trained to predict the insertion phrase corresponding to the mask token based on the expanded query.

* * * * *